United States Patent [19]

Kestner et al.

[11] 4,125,152

[45] Nov. 14, 1978

[54] SCALE RESISTANT HEAT TRANSFER SURFACES AND A METHOD FOR THEIR PREPARATION

[75] Inventors: Mark O. Kestner, Evanston; Robert H. Krueger, Palatine, both of Ill.

[73] Assignee: Borg-Warner Corporation, Chicago, Ill.

[21] Appl. No.: 834,600

[22] Filed: Sep. 19, 1977

[51] Int. Cl.$^2$ ............................................. B05D 3/06
[52] U.S. Cl. .............................. 165/133; 165/DIG. 8; 427/41
[58] Field of Search ...................... 427/38, 39, 40, 41; 165/133, DIG. 8

[56] References Cited

U.S. PATENT DOCUMENTS

| | | | |
|---|---|---|---|
| 3,050,786 | 8/1962 | St. John et al. | 165/133 |
| 3,068,510 | 12/1962 | Coleman | 427/39 |
| 3,389,012 | 6/1968 | Hamm | 350/199 |
| 3,617,354 | 11/1971 | Carnahan | 428/205 |
| 3,663,265 | 5/1972 | Lee et al. | 427/41 |

*Primary Examiner*—John H. Newsome
*Attorney, Agent, or Firm*—Richard J. Schlott

[57] ABSTRACT

Heat transfer surface of cooling water systems and boilers are made resistant to the deposition of adherent scale by coating with plasma-polymerized fluoroethylene monomer.

5 Claims, No Drawings

SCALE RESISTANT HEAT TRANSFER SURFACES AND A METHOD FOR THEIR PREPARATION

BACKGROUND OF THE INVENTION

This invention relates to a method for making the heat transfer surfaces of cooling water systems and boilers resistant to the formation of scale deposits and fouling. More particularly the invention is a method for making heat transfer surfaces resistant to the deposition of scale and fouling by coating the surfaces with a film of plasma-polymerized fluoroethylene monomer.

In heat exchange equipment, the formation of scale and fouling on heat transfer surfaces lowers the efficiency of the surface and can cause overheating and damage. Scaling is caused by crystallization and/or precipitation of salts, mainly calcium carbonate, to form a hard adherent layer on the surface. Such scale may be controlled by pretreatment to remove scale-forming constituents or by increasing or broadening the solubility of scale-forming salts through use of dispersants, often coupled with blowdown procedures to remove accumulated sludges and to lower the concentration of dissolved solids. Although many such prior art methods exist which markedly reduce the scaling rate, these do not completely eliminate the problem and with time, scaling becomes sufficient to reduce efficiency and requires cleaning and/or replacement of the heat transfer surfaces. A method for reducing the formation of adherent scale on heat transfer surfaces could alone be a useful advance in the art, and could when used with prior art water treatment processes markedly extend the useful life of heat transfer equipment.

SUMMARY OF THE INVENTION

The instant invention is a method for inhibiting the formation of adherent scale deposits on heat transfer surfaces by coating said surfaces with a film of plasma-polymerized fluoroethylene monomer. The coated surfaces resist the deposition of adherent scale.

DESCRIPTION OF THE INVENTION

Heat transfer surfaces exposed to aqueous fluids may be made markedly resistant to the deposition of adherent scale by coating with plasma polymerized fluoroethylene monomer such as tetrafluoroethylene.

Methods for forming plasma-polymerized coatings on surfaces from fluoroethylene monomers are widely known in the art. In general, the polymerization is accomplished by adding monomer vapor to a radio frequency-generated low pressure plasma employing an inert gas such as argon. When carried out in the presence of the substrate, polymer is uniformly deposited on the exposed surfaces. The process is applicable to a variety of fluoroethylene monomers including for example tetrafluoroethylene perfluorobutene-2, chlorotrifluoroethylene, difluoroethylene and the like. For the purposes of this invention the preferred fluoroethylene monomer will be tetrafluoroethylene. Plasma polymerization provides poly(tetrafluoroethylene) PTFE coatings on substrates which, being uniform and very thin, do not significantly affect heat transfer properties of heat transfer surfaces.

For the purposes of this invention, the plasma polymerization process will be carried out in the presence of metallic substrates which are to be used in heat exchanges as heat transfer fluid conduction means, usually in the form of metal tubes. The coating will be deposited on those surfaces which subsequently will be in contact with aqueous heat transfer fluids. Conventional plasma polymerization techniques deposit uniform and extremely thin coatings on the substrates. The coatings will generally range in thickness from a single monolayer to as thick as 1/10,000", depending upon the length of time of the polymerization. Considerably greater coating thicknesses may be applied by a protracted polymerization. For the purpose of this invention very thin coatings are preferred because polymeric coatings generally have a deleterious effect on the heat transfer properties, and these effects will be minimal for coatings of less than 1/10,000 inch in thickness. To be effective in reducing the deposition of scale, it is necessary that those surfaces of the heat transfer fluid conducting means which contact aqueous heat transfer fluids be coated with at least a monolayer of plasma-polymerized fluoroethylene monomer.

EXAMPLES

In the following Examples, copper coupons $1\frac{1}{4}" \times \frac{3}{4}" \times 0.06"$ were plasma-coated with PTFE. The samples were prepared by first abrading the surfaces with 600 grit emery paper, then solvent cleaning and air-drying the coupons. The coupons were placed in a vacuum cleaner under argon at $10^{-3}$ torr and a plasma was initiated with 13.56 megahertz radio frequency energy. Tetrafluoroethylene monomer was bled into the plasma over a 5 to 10 minute period. The monomer polymerized and deposited on the coupon surfaces as PTFE.

Scaling tests were run by immersing the coupons in a supersaturated aqueous calcium carbonate solution (pH9) for a period of 18 hours at room temperature. The scaled coupons were removed from the calcium carbonate solution, rinsed with 200 ml of deionized water, then dried by first rinsing with acetone, then ethanol and blown with a nitrogen stream. The amount of adherent scale was determined by dissolving the scale with 3N HCl and determining the amount of calcium as PPM/$CaCO_3$ by atomic adsorbtion spectroscopy.

Control and Comparative Examples were also prepared and similarly exposed to saturated $CaCO_3$ solution. Three uncoated controls were prepared by sandblasting, by abrading with 120 grit emery paper and by polishing with 6 micron diamond paste, respectively. Two coated controls were prepared--one by dip coating a coupon with a commercial 7.5% fluoropolymer solution in freon and a second by dip coating a coupon with a commercial 14% solids fluoropolymer dispersion in water. The coatings were air dried, then heated at 130° C. to further dry the samples.

The scale deposition data are summarized in Table I.

Table I

Scale Deposition Tests on Copper Coupons

| Ex. No. | Surface Treatment | Coating | $CaCO_3$ (PPM) | Scale Reduction (%)[1] |
|---|---|---|---|---|
| 1 | 600 grit Emery | PTFE | 1.0 | 94 |
| 2 | " | " | 1.1 | 91 |
| 3 | Sand Blast | None | 14 | — |
| 4 | 120 grit Emery | None | 16 | — |
| 5 | 6μ grit polish | None | 12.3 | — |
| 6 | 600 grit Emery | Fluoropolymer Emulsion | 5.0 | 59 |
| 7 | " | Fluoropolymer Solution | 4.3 | 65 |

Notes: [1]Scale reduction is based on best non-coated sustrate, Example 5

It will be apparent from these data that highly polished surfaces of Example 5 are readily coated with adherent scale under the mild conditions of these tests, whereas for the plasma coated PTFE surfaces of Examples 1 and 2 the amount of scaling is reduced by more than 90%. Dip coating to provide fluoropolymer surfaces on the copper coupons (Examples 6 and 7) does reduce the deposition of adherent scale, but not nearly as effectively as do the plasma-coated surfaces of Examples 1 and 2.

EXAMPLE 8

For comparison purposes, a sample coupon was prepared from a sheet of Teflon brand polytetrafluoroethylene. The Teflon coupon and a copper coupon control, each with no prior surface treatment, were exposed to supersaturated calcium carbonate solution as before. The amount of scaling for the control copper coupon was 20 ppm, and for the Teflon coupon was 10 ppm.

It is surprising that neither Teflon sheet nor fluoropolymer dip coatings are nearly as resistant to the formation of adherent scale as the very thin plasma-polymerized PTFE coatings. Thus, applying PTFE coatings by a plasma polymerization process provides an unexpected advantage over dip-coating methods or techniques wherein a pre-formed PTFE film is adhered to the surface. The plasma polymerizion process deposits extremely thin films which do not materially alter heat transfer properties and which are in a form that resist scaling better than even PTFE films alone (Example 8).

The invention will be seen to be a method for reducing the formation of adherent scale on the heat exchange surfaces of cooling equipment and heating equipment comprising coating said surfaces with plasma-polymerized fluoroethylene monomer.

Heat exchangers having heat transfer fluid conduction means wherein the surfaces in contact with aqueous heat transfer fluids are coated with plasma-polymerized fluoroethylene monomer will resist the deposition of adherent scale and corrosion, and will thus be expected to have extended life and to be less subject to efficiency losses and failure due to overheating.

We claim:

1. A method for rendering heat transfer surfaces resistant to the deposition of adherent scale consisting of plasma-polymerizing fluoroethylene monomer in the presence of said surfaces, and depositing on said surfaces a fluoropolymer coating.

2. The process of claim 1 wherein the coating thickness is less than about 1/10,000 inch.

3. The process of claim 2 wherein said fluoroethylene monomer is tetrafluoroethylene.

4. In a heat exchanger comprising heat transfer fluid conducting means and aqueous heat transfer fluid, the improvement wherein the surfaces of said heat transfer fluid conducting means contacting said aqueous heat transfer fluid are coated to a thickness of less than 1/10,000" with plasma-polymerized fluoroethylene monomer.

5. The heat exchanger of claim 4 wherein said fluoroethylene monomer is tetrafluoroethylene.

* * * * *